Feb. 14, 1961 W. W. CLEMENTS 2,972,091
ELECTROMAGNETIC DEVICE
Filed Feb. 24, 1959

*INVENTOR.*

WARNER W. CLEMENTS

United States Patent Office 2,972,091

Patented Feb. 14, 1961

2,972,091

ELECTROMAGNETIC DEVICE

Warner W. Clements, 13435 Java Drive,
Los Angeles, Calif.

Filed Feb. 24, 1959, Ser. No. 795,255

11 Claims. (Cl. 317—190)

*Classification of invention*

My invention is in itself an entirely new type, genus, or class of electromagnetic devices. However, in a broader sense it can be classified with those prior-art electromagnetic devices which are designed to receive a similar stimulus and to evince a similar response.

The common stimulus for devices thus classified together is an intermittent flow of electrical current of unspecified polarity through a pair of electrical connections. Each time a response is required, the current is turned on and then off again. Usually the "on" time will be much briefer than the "off" time, but it is not required that this be the case. (Hereinafter I shall use the word "impulse" to designate an electrical current flow of finite, but not necessarily short, duration.) Since the stimulus called for need not have a particular polarity—in some cases it may even be an alternating current—so-called "polarized" devices are automatically excluded from the class being defined. Furthermore, the specification of two electrical connections excludes so-called "three-wire-control" devices.

The nominal response of devices of the subject class is a shifting of some member back-and-forth (not necessarily reciprocatively) between two alternative quiescent positions. If these positions be designated respectively "A" and "B," what happens is that upon the occasion of one electrical impulse the member shifts from "A" to "B"; upon the next impulse it shifts from "B" to "A"; and so on, arriving in each position on the occasion of every second impulse. My invention can be employed to produce a more complicated sequence, but for purposes of classification it most likely belongs with devices that produce the sequence indicated.

*Distinction of invention*

Devices according to the present invention differ from others in the same general class in important respects. In the first place, many prior-art devices in the class produce their sequential action by translating an orginal mechanical response that is immediately repetitive, rather than sequential, in character. To understand what I mean, let the reader consider the familiar ball-point pen with a retractible point. To make the point extend, retract, extend again, and so on in sequence, one need only keep pressing the button on the top of the pen. The action of pressing the button is a strictly repetitive one but internal mechanism translates it into a sequential action on the part of the point.

Similar translating mechanism is found in the prior-art electromagnetic devices just referred to. Their original electromagnetic action may consist of an "armature" being attracted to a "pole" upon the occasion of each and every electrical impulse. The translating mechanism then takes over and produces the required alternating sequence of actions in a secondary member.

According to my invention, by contrast, the required sequential action is induced directly in the armature itself. That is to say, the armature shifts from one to the other of two quiescent positions upon the occasion of each impulse. (It is possible for a team of two armatures to be used in place of a single armature in my invention. I will hereinafter use the term "armature means" where I wish to embrace both the singular and the plural construction. The term will be further defined in a following section.)

In the second place, my invention teaches a way to make magnetic attraction do the work of a latch or a catch. Magnetic attraction alone is relied on for the purpose of maintaining the position of a certain principal part during periods of energization and for releasing it afterward. For roughly corresponding purposes prior art devices have relied on mechanical restraints, which must, of course, include moving parts.

In the third place, my invention does not rely, in its operation, upon either momentum effects or self-switching arrangements, as do certain prior-art devices in the same general category. It teaches a simpler way to accomplish corresponding ends.

In the fourth place, certain other prior-art devices in the class require forked poles, which poles must necessarily be placed at some distance from the center of any coil means. My invention, on the other hand, teaches the use of simple, singular poles and shows how they can be placed quite close to the center hole through a coil.

These distinctions are listed here to show that my invention is a pioneer one and should not be too closely identified with the prior art with which it must be classified. Other differences from the prior art, and an understanding of the advantages which flow from such differences will be made apparent by what follows.

I have on file a co-pending application bearing Serial Number 617,173, dated October 19, 1956, now Patent No. 2,885,606, for Impulse Type Electromotive Device. For convenience, the co-pending application thus identified will hereinafter be referred to as the "antecedent application" and the invention it covers will be referred to as the "antecedent invention." The distinctions just claimed for the present invention can also be claimed for the antecedent invention, as it happens that the two are quite similar. Therefore, strictly speaking, the pioneer status of the present invention is shared by the antecedent invention. Nevertheless, the essential difference between the two inventions is an important and basic one. In order to point out this essential difference it will be necessary to give a brief description of both inventions. Such a description will be undertaken as soon as general nomenclature can be established.

*General principles and nomenclature*

The artizan is assumed to be familiar with devices of the general class described. Unfortunately, there are varied usages with regard to naming the parts of such devices. Furthermore, a somewhat loose or doubtfully valid theory is often relied upon to explain their operation. In order to make it perfectly clear what I am talking about in the following disclosure and claims it is necessary at this point that I define those of my terms that are generally applicable to such devices, and review some theory in the process.

Any device of the general type described contains but two major or basic components. These are, respectively, the electrically conductive and the magnetically conductive components. I shall call the first of these components the "coil means" and the second one the "magnetic structure." The function of the coil means is to "magnetize" (magnetically energize) the magnetic structure as required. The function of the magnetic structure is to respond to magnetization with a useful mechanical motion of some kind.

The useful mechanical motion developed in the magnetic structure is necessarily a relative motion between respective parts of that structure. Rather than make all of such parts movable, it is the usual practice to make one part or group of parts movable and the remaining part or parts fixed (relative to incidental mounting and supporting structure). On this basis I shall refer to the movable part or parts of any given magnetic structure as the "armature means" and to the immovable part or parts as the "stator frame."

In the past a slightly different basis has sometimes been relied on for deciding which portion of a magnetic structure is which. That is to say, the stator frame has been identified as that portion which is associated with the coil means in forming an "electromagnet" and the armature means has been identified as that which is attracted to the "electromagnet." Although it usually amounts to the same thing, the latter approach can sometimes lead to confusion, not only with regard to definition but also with regard to theory of operation. The truth is that magnetic attraction is always mutual. Furthermore, one cannot magnetize only a portion of a magnetic structure any more than one can electrify only a portion of a closed electrical circuit. In short, the distinction between a stator frame and an armature means is at best a mechanical one. In a magnetic sense there is an inescapable equivalance between the two components.

Whenever I use the term "magnetic structure" I mean to imply the presence of a number of features which are essential to such a structure as used in devices of the type described. One such feature is construction from "magnetic materials." By "magnetic" materials I mean materials which can be magnetized readily, but which do not retain appreciable magnetism after the magnetizing force ceases. (I do not mean to include those materials which are primarily suitable for permanent magnets.) Examples of suitable materials are Armco ingot iron and Allegheny relay steels.

A second essential feature of a magnetic structure is that although it can be variously arranged there are nevertheless definite limitations as to the shapes it can take. These limitations are topological in nature. Just as not every arrangement of a piece of rope constitutes a knot, so not every arrangement of magnetic materials constitutes a magnetic structure. The requirements as to shape are understood by one skilled in the art to the extent that he can at any time take magnetic materials and arrange them into a suitable magnetic structure. The requirements he must observe in the process can be summarized by saying that a magnetic structure must take the form of a substantial portion of a consolidated closed path for magnetic lines of force around and through a coil means having realizable form. (Lines of force are known collectively as "flux." Magnetic flux is the "flow" in a magnetic circuit which corresponds with current in an electrical circuit.)

A third essential feature of a magnetic structure is likewise, in a sense, topological: If at least one part of the structure is to be movable while the remainder is stationary, there must exist at least one variable "gap" between respective parts. A magnetic structure may also incorporate one or more non variable gaps, as between two members of that structure which are stationary, or whose relative movement is negligible. However, I will hereinafter use the term "gap" to apply only to the variable variety. The gap is of considerable importance in a magnetic structure because it is the seat of the magnetic attraction which causes the useful movement of the associated armature. The direction of that magnetic attraction is always such as to tend to move the armature to directly decrease the reluctance of the gap. (The "reluctance," in turn, is the measure of the opposition presented by the gap to the establishment of magnetic flux across it.) Since the way that reluctance varies with armature positioning is determined by the conformations of the gap, the direction in which the armature is attracted is to some extent under the control of the designer.

I shall have frequent occasion to use the term "pole." I mean by the term a region on a magnetic structure from which flux emerges into a region of variable reluctance. Thus, in a simple electromagnetic device having but one working gap, there would normally be but two poles, one on each side of the gap. Any other magnetic terminals in the device would not be called "poles" according to my definition.

As a final note on the characteristics of magnetic structures it should be added that there are in the prior art so-called "magnetic structures" in which branches are arranged to be magnetized separately and independently. I do not mean the term to embrace such constructions, which are in reality a plurality of magnetic structures tied together in each case. I mean the term to imply the presence of but a single magnetic circuit (although the main loop may, of course, be branched at places).

Turning now to the coil means, little further definition is required. I mean the term to embrace all single or multiple coil or winding arrangements suitable for energizing a single magnetic circuit. Where separate windings are used, I imply that they are connected in series or parallel with polarity determined according to Ampere's rule so that they will aid each other magnetically.

The necessary relations between a coil means and a magnetic structure are well known. The coil means must be mounted so that the effective flow of current loops about the effective "flow" of flux (or vice versa). Given any magnetic structure meeting the definitions above, the artizan can readily provide it, without further instruction, with a coil means adapted to energize it.

I speak interchangeably of energizing a magnetic circuit or a magnetic structure, for when you energize the whole you simultaneously energize each of the parts. Of course, it is necessary to energize the coil means electrically in order to energize the magnetic structure magnetically. (A coil means is energized electrically by causing a current to flow through it.)

*Essence of the antecedent invention*

A brief discussion of the antecedent invention is necessary for two purposes: First, it will serve as an introduction to the present invention as the two are similar and the earlier is the simpler. Second, it will permit the establishment of the essential difference between the two inventions.

It has already been indicated that in both inventions the necessary two-step response is elicited directly in the armature means. Since the armature means moves only by virtue of magnetic attraction, it follows that it must be attracted in one direction on the occasion of one energizing impulse and in another direction on the occasion of the following impulse. In order to bring about the changed direction of attraction, it is obvious that something must be changed between impulses; otherwise the behavior of the armature means would be the same on each occasion. It is highly desirable that the necessary change between impulses be a simple and minor one, rather than one that is complicated or critical. In the antecedent invention the necessary change has been reduced to the ultimate in simplicity: a comparatively minor amount of magnetic material in detachable form is removed from the magnetic structure at one point and the same material or an equivalent portion is added to the structure at another point, and vice versa on alternate occasions. (Note that the overall structure is thus affected at only two points and that the detachable material is present at only one of these points at a given time.) The appropriate transfer of detachable material takes place automatically at the end of each impulse and each transfer sets up the proper conditions for a stroke of the armature to follow on the next impulse.

At this point the reader will want to know, "What brings about this transferring of detachable structure materials and ensures that it will take place in the right direction and at the right time?" The antecedent invention teaches one general answer to this question. A "potential energy storing means," such as one or more springs, is arranged to develop from each stroke of the armature means a force or tension that will urge the detachable material toward that one of its positions in the overall structure which will be appropriate when the next impulse arrives.

However, the detachable material cannot be allowed to move as soon as the armature means does, or there would be a change of the forces which act on the latter before it could even complete its stroke. To keep the detachable material from moving prematurely, its natural magnetic attraction to that part of the magnetic structure to which it happens to be applied is relied upon. This attraction ceases at the instant of de-energization and thus allows the indicated action to take place at that time.

The application of the principles thus briefly outlined permits the construction of devices which are much simpler, much more reliable, much faster in operation, and much more versatile than comparable prior-art devices.

(The reader is warned that terminology applied to the antecedent invention in this section does not necessarily correspond with that used in the antecedent application.)

*Essence of the present invention*

The principal components of the present invention are each identifiable with those of the antecedent invention. They will, however, be considered in greater detail in the present connection.

The coil means required for the present invention may be conventional in every way. A definition for the term itself has already been given.

The magnetic structure that is required is also conventional, or nearly so, if considered only in one or the other of its alternate overall forms with detachable material in place. However, for the sake of separately identifying components it is necessary to consider the structure as it exists with all detachable magnetic material completely removed from it. What is left is a magnetic structure which still defines a magnetic circuit and otherwise meets the definitions already given for such a structure. But it will be a magnetic structure of a form unfamiliar to the artizan because when it is magnetically energized its armature means is not primarily attracted in one direction or another. (It may tend feebly to center itself in its permitted travel range. Or it may act, in a sense, like a playground teeter-totter with no occupants: when either end of the latter is placed on the ground it will stay there, with no inclination to leap up and yield the grounded position to the other end.) To distinguish a magnetic structure in this stripped form it will be called an "operationally symmetric" magnetic structure.

By "operationally symmetric" I do not mean to imply any particular kind or mode of physical symmetry. A structure of the type indicated will, however, always exhibit magnetic symmetry with regard to the permitted travel range of the armature means. Specifically, a full stroke of the armature means will always result in no appreciable net change in the total reluctance of the magnetic circuit involved. In preferred embodiments there are two successive gaps in the magnetic circuit. A full stroke of the armature means will bring about a decrease of reluctance in one of these gaps and a matching increase in the other, thus leaving the total reluctance unaffected.

An important characteristic of an operationally symmetric magnetic structure is that it is possible to disturb its symmetry by applying a minor amount of additional magnetic material at a strategic point, to the end that the armature means will be impelled to a desired position when next the structure is magnetically energized. The additional material to be used for this purpose will hereinafter be called "auxiliary" magnetic material. This corresponds with material that was earlier called "detachable." (Note that what is "detachable" when viewed from the standpoint of the overall augmented structure becomes "auxiliary" when viewed from the standpoint of the un-augmented, or operationally symmetric, structure.)

In preferred versions of my invention each of the poles of the magnetic structure is "singular." By this I mean only that the structure is arranged to keep each pole continuously in the principal flux path despite movements of the armature. In other words, no pole has an alternate which does its work a part of the time. (There are certain circumstances under which a pole may be split into two or more separate areas, but I would consider all such areas to constitute but a single pole as long as they are designed to all simultaneously share the same function in the operation of the device.)

The armature means portion of the magnetic structure consists of either one or two armatures. Where two armatures are used it is only for reasons of mechanical convenience and there is no variation whatsoever in the basic theory of operation. For that reason it should be clearly understood that the armature means in my invention is always movable strictly as a unit. By this I mean that if the armature means happens to consist of two separate armatures, then these two armatures must be linked together in some way so that the motion of one is inelastically transmitted to the other.

Usually some means, such as a detent or a snap spring arrangement, will be included for the purpose of holding the armature means in either of its quiescent positions and making it resist displacement therefrom. However, ordinary friction can be made to serve the same purpose; in a crude embodiment enough inherent frictional opposition to armature movement might be present to do away with the necessity for a separate armature retaining means. It also happens that in some cases an armature-retaining effect could originate in outside apparatus to which the armature means is coupled for driving purposes. Here, again, the function of retention would be fulfilled without the incorporation in the invention proper of a separate means for fulfilling it. To imply the presence of the necessary function, however achieved, I shall speak of the quiescent positions of the armature means as "stable" positions.

The stator frame in the present invention is principally characterized in that it must combine with the armature means in such a way as to form an operationally symmetric magnetic structure. In an earlier section I have pointed out that the direction in which a given armature is magnetically urged at a gap is, to an extent, under the control of the designer. It can be further pointed out that the designer also has control of the direction the armature will be permitted to move when urged in a given direction, and the two directions need not be the same. (By way of illustration, consider a skier. The force which impels him acts in only one direction, namely straight down. Yet, he is able to proceed in a variety of directions by adjusting the path which his skis and the terrain permit him to take.) These variables in the hands of the designer with ordinary skills will permit him to create a wide variety of suitable operationally symmetric magnetic structures on the basis of the teachings herein.

The auxiliary magnetic material in my invention must be movably mounted so that it may be readily shifted into one structure-augmenting position or the other. The material that serves to augment the structure in one of these positions may or may not be the identical material which serves to augment the structure in the other position. Where respective portions of material are used they may constitute opposite ends of an enlongated integral piece, or they may even be separate segments. If two separate segments are used, they must be linked together in some way or integrally connected in order that motion of either will be inelastically transmitted to the other.

When I speak of "structure-augmenting positions" I means positions relative to the particular component of the magnetic structure which is to be augmented. If the latter component is the armature means, for instance, then the auxiliary material could ride back and forth with the armature means without changing its position relative to the armature means, and hence without changing its structure-augmenting position.

For purposes of effectively augmenting the magnetic structure, the auxiliary material need not make immediate and intimate contact with said structure. The operation of the device will not be impaired if a very slight spacing is maintained at this point. When I speak of the auxiliary material being "applied to" the structure I mean to allow of such spacing.

The combination of the auxiliary material and whatever means is incorporated for positioning said material as required constitutes the "controlling means." It is in this "controlling means" that the essential difference between the antecedent invention and the present invention can be found. The antecedent invention contemplates that a controlling means may take various forms. However, the forms that are actually taught in the antecedent application are without exception forms in which the auxiliary material is shifted all of the way from one to the other of its structure-augmenting positions during each period of de-energization and all of the way in response to the bias exerted by a potential energy storing means. According to the present invention, by contrast, the auxiliary material is shifted only part of the way during periods of de-energization and only part of the way in response to the bias exerted by the potential energy storing means. More specifically, in the present invention the potential energy storing means is arranged to transport the auxiliary material, upon de-energization, to a point near to, but not coinciding with, the appropriate structure-augmenting position. The auxiliary material is yieldably maintained in the latter position until the onset of fresh energization, at which time it is moved the rest of the way into structure-augmenting position by magnetic attraction. Thus, at the start of each impulse the auxiliary material will make a slight shift prior to the stroke of the armature means.

The latter arrangement has the distinct and worthwhile advantage of being a way to attain greatly improved efficiency. What it contributes to the older design is an ingenious and highly satisfactory scheme for lengthening the stroke of the movable means which includes the auxiliary magnetic material. The longer stroke, in turn, permits the auxiliary material to be held, at the instant when the armature means starts to move, farther away from that one of its structure-augmenting positions which it is not occupying. The auxiliary material will thus cause less flux diversion or leakage in the region of the latter position, with the result that the armature means will be initially impelled with much greater force. This advantage is gained at the same time that the advantages of the antecedent invention already listed are respectively retained.

*Illustrative embodiment*

The antecedent application shows five illustrative embodiments. Since the invention covered by that application is a broad and basic one, it could legitimately have shown scores of embodiments, all differing from each other at least to a degree.

Nearly all of the possible variations of the antecedent invention have equivalents in the present invention. However, the basic principles of the present invention are the same, whatever the embodiment. Rather than burden this application with a great quantity of illustrative material, I will describe in detail but a single embodiment. It has been possible to choose for the purpose an embodiment that is not only perhaps the most meritorious, but is also one well suited for teaching how to apply the invention. With the help of the teaching already set forth herein, the artizan will be able to adapt the design principles exemplified in the illustrative embodiment to other embodiments as required. It should be clearly understood that the invention is not limited to the particularly type or species represented by the illustrative embodiment.

*Drawings*

Fig. 1 shows a number of important parts in perspective.

Figs. 2 through 5 are sectional views of the device taken with its axis lying in the sectioning plane. These views, taken in order, show the movable parts going through a sequence of motions related to a single period of energization. One important part, namely yoke 20, does not show in these latter figures because it is assumed to lie on the observer's side of the sectioning plane.

Fig. 5 thus also represents the second of the two possible conditions in the quiescent state.

*Structural arrangement of illustrative embodiment*

Figure 1:
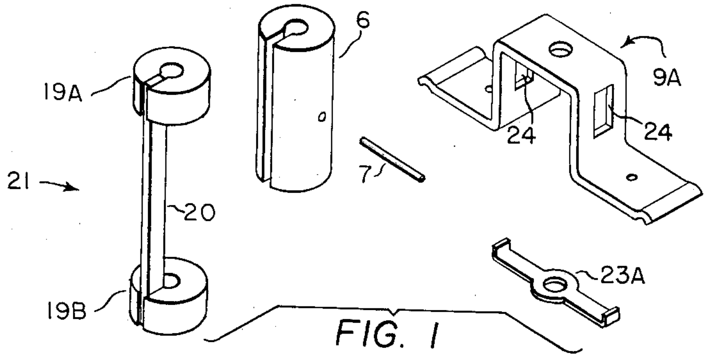

In what follows the directions of "up" and "down" on the illustrative embodiment will be taken to be those which appear to an observer of the drawings. It should not, however, be concluded that the device will work only in the position shown, for it will normally work equally well in any position.

The armature means of the illustrative embodiment is a single, cylindrically shaped armature 6, made entirely of magnetic material. The armature is affixed by pin 7 to shaft 8. The shaft, in turn, is mounted to slide freely in longitudinal directions through holes in brackets 9A and 9B. The travel of the armature-shaft assembly is limited to that between one extreme where ferrule 10 strikes against bracket 9A, as in Fig. 2, and another extreme where head 11 strikes bracket 9B, as in Fig. 4.

A means, specifically a flat snap spring 12, is provided for the purpose of biasing the armature-shaft assembly to assume one or the other of its extreme positions (which positions thereby become stable positions). The snap spring is a flat, circular disc of thin spring material to which a slight dome-shaped dishing has been imparted in such a manner as to make the spring bistable. Such snap springs (sometimes called "toggle" springs) are quite familiar to skilled mechanics. Snap spring 12 is loosely supported between two flattened rings 13, which have their inner edges bevelled for the purpose. These rings, in turn, are supported by brackets 14. Only two of the latter brackets are shown, in order to avoid obscuring more important details in the drawings. In practice it is preferable to use either three or four brackets to support the snap spring assembly. Ferrule 10 provides the necessary coupling between shaft 8 and snap spring 12.

This ferrule fits loosely in a hole in the spring but is rigidly affixed to the end of the shaft.

The coil means of the embodiment is a single, solenoidal coil 15, which can be supplied with current through leads 25. These leads will ordinarily be connected to an external electrical source and external switching means. Such external apparatus forms no part of the invention proper and need not be discussed here.

The stator frame of the embodiment comprises two disc-shaped end plates 16A and 16B plus a tubular enclosure 17, all of which are made of magnetic material. It can be seen that the parts of the stator frame in combination with armature 6 constitute a magnetic structure, one in which the flux can "circulate" from the upper end of armature 6 through plate 16A, down through enclosure 17, and back through plate 16B to the lower end of the armature. Because of the movability of the armature, there are two variable air gaps in the magnetic circuit thus defined. The flux will emerge from the stator frame into these two air gaps at the respective inner surfaces of the central holes in end plates 16A and 16B. These latter surfaces, accordingly, form the two poles of the stator frame, which poles are indicated respectively at 18A and 18B. (Note that each of these two poles is "singular" in the sense earlier defined.) As for the armature, its two poles are its respective ends.

Given a magnetic structure including only the parts named up to this point, it must now be considered what effect it will have on the armature to magnetize the magnetic structure as a whole. It can be seen that if the armature were to move to close up one of the gaps, it would only open up the other one an equal amount. Under these circumstances, the armature will not experience any attraction urging it primarily in one direction or the other. (Actually, it may experience a comparatively weak force tending to center it between the poles. In short, the structure indicated is of a type I have earlier described as "operationally symmetric." It can be seen that coil 15 is properly mounted in magnetically energizing relationship to this operationally symmetric magnetic structure.

For the purpose of disturbing the operational symmetry required, auxiliary magnetic material is provided in the form of two short, cylindrically shaped segments 19A and 19B. These two segments are integrally connected by a yoke 20 (made of non-magnetic material) so that they are maintained in alignment with each other and at a fixed distance apart. The segments and the yoke can thus be considered to together constitute a single "auxiliary member," which is indicated generally at 21. The auxiliary member is mounted on shaft 8, by means of holes through the respective segments, so that it can slide freely in longitudinal (axial) directions. The motion of the auxiliary member is thus independent of the motion of the armature between the limits where one or the other of the segments butts against the armature.

Under certain operational conditions, which one skilled in the art can anticipate, trouble may be experienced with one or the other of the segments sticking to the armature after de-energization. To prevent this difficulty a very slight spacing can be maintained between the respective magnetic materials in armature and segment under those circumstances wherein the two members are in effective contact. This spacing can be accomplished by interposing a knob or layer of non-magnetic material in one form or another. I have used the simple method of electroplating the ends of the armature with brass, and it worked very well.

Means are provided for biasing the auxiliary member toward the midpoint of its operational travel range (which in this case is also a point where the respective segments are equidistant from the midpoint between poles 18A and 18B). The necessary means include two springs 22A and 22B as well as two retainers 23A and 23B. The two retainers are loosely mounted on shaft 8 and they extend through slots 24 in brackets 9A and 9B. The longitudinal travel of the retainers is thus limited to the length of the slots in which they are respectively mounted.

The inner ends of springs 22A and 22B are hooked over outer lips or flanges on retainers 23A and 23B. The outer ends of these same springs are fastened close to the main body of the device by extensions of brackets 9A and 9B. These springs are originally wound as flat spirals and consequently are under tension when stretched to the conical shape the mounting forces then to assume.

Details of the construction just described may readily be modified to meet specific circumstances. A worthwhile modification, where the extra resulting cost can be justified, is to have end plates 16A and 16B dished toward each other at the poles, and perhaps at their periphery as well. The most efficient shape of all for the stator frame structure would be that approximating the outer shape of a doughnut.

In the form depicted in the drawings, the device is primarily suited for operating on direct current. It will also operate on A.C., although a few obvious precautions in construction for the latter service are advised. In particular, yoke 20 should be made of a material that is low in electrical conductivity so that it can constitute an effective bar to eddy currents in both armature and auxiliary member.

A counterpart of the device shown which was built for heavy-duty A.C. operation might look somewhat different from the device depicted, inasmuch as the magnetic structure of the A.C. variant would be made of laminated materials and would most conveniently have a rectangular cross section throughout. Each pole on the stator frame of such a structure would be represented by two areas, physically separated, but magnetically and operationally a single entity. The general form of the A.C. version can be visualized as a flat slice (as between two planes parallel to each other and to the axis) out of the center of the device shown in the drawings. The necessary adaptation from the device shown is well within the capabilities of one skilled in the art and presents no special difficulties that need to be dealt with here.

*Operation*

During quiescent periods the movable parts will be positioned in one or the other of two patterns. These patterns are shown respectively in Figs. 2 and 5. Considering first the situation of Fig. 2, one finds the armature 6 held firmly at the lowermost end of its travel by residual tension in snap spring 12. This position is one of the two stable positions available to the armature proper. Meanwhile, the auxiliary member 21 is held in its central position, from which it can depart only by stretching one or the other of the two spiral springs 22A and 22B. Note that retainers 23A and 23B are both bottomed in their respective slots. This means that the tension in one spring cannot cancel out the tension in the other insofar as their effect on the auxiliary member is concerned. If the latter member strays from its central position it encounters a comparatively high restoring force at once, rather than encountering only a weak restoring force for the first part of its travel.

Figure 2:
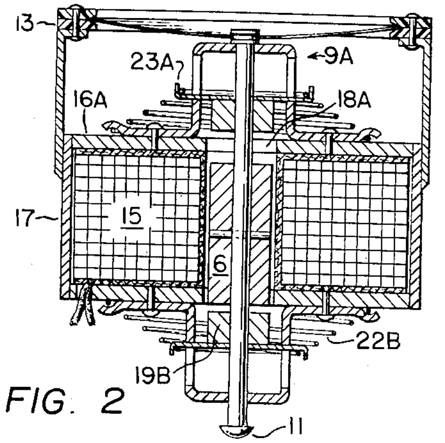
Fig. 2 shows the movable parts in one of the two arrangements of position they will normally hold during quiescent periods.
Figure 5:
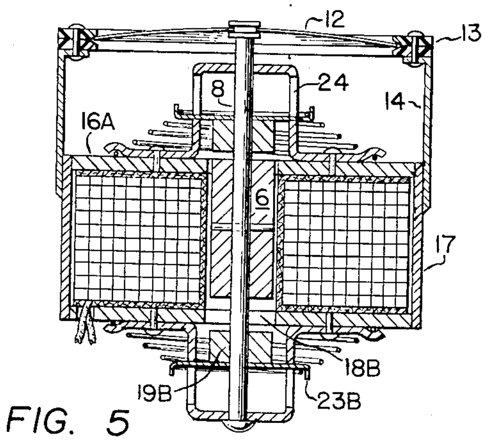
Fig. 5 shows the arrangement the same parts will assume upon de-energization after being in their Fig. 4 positions.

The pattern of Fig. 5 is the inverse of that of Fig. 2. In Fig. 5 the armature is in its other stable position, at the uppermost limit of its permitted travel. The absolute location of the auxiliary member in Fig. 5 is the same as it is in Fig. 2. Yet its situation in a magnetic sense is considerably different, due to the altered position of the armature. (The device will be understood in its most general aspects and the equivalence of the embodiment shown to other possible embodiments will be most readily grasped if the observer will mentally take the position of the auxiliary member to be that position which it holds at any instant relative to the armature.) If the device is energized in the circumstances of either Fig. 2 or Fig. 5, one segment of the auxiliary member will be strongly attracted toward the armature and the other segment will scarcely experience any attraction at all. In Fig. 2 it is segment 19B which will experience the strong attraction, whereas in Fig. 5 it is segment 19A which will experience the strong attraction.

At this point it is possible to draw an important comparison with the antecedent invention. In that invention, in the two corresponding quiescent positions, one segment would be in contact with the armature and the other segment would be even with, or slightly within, the opposite pole. But only that segment which is actually in contact with the armature is in a position to immediately contribute to the operation of the device. The opposite segment is merely standing by, and any flux it diverts or any magnetic attraction it experiences can degrade (by comparison) the performance of the device. Lacking an improvement such as brought about by the present invention, the idle segment will, indeed, be close enough in to the working gap to both divert flux and experience attraction. If the end plates corresponding with 16A and 16B be constructed dished inwardly, then the performance of the antecedent invention will suffer even more by comparison with the present invention (because of the increased tendency of the idle segment to attract flux under that particular circumstance).

To return to direct consideration of the present invention: Starting with the situation of Fig. 2, the first action that takes place after energization is the snapping upward of the auxiliary member from its Fig. 2 position to its Fig. 3 position. This motion is made against the opposition of spring 22A. In its new position segment 19B is in effective contact with armature 6, to which it has been magnetically attracted and to which it will remain "stuck" as long as energization persists. Whether or not there remains a very slight spacing between armature and segment (for purposes already mentioned), the armature has for all practical purposes been lengthened. The overall magnetic structure, as thus augmented, becomes for the moment one in which the reluctance at pole 18B remains low and constant, so that the only remaining variable air gap is that between pole 18A and the armature. Under these circumstances a strong force is developed urging the armature upward. In response to this force, the movable parts will next shift to their Fig. 4 positions.

Figure 3:
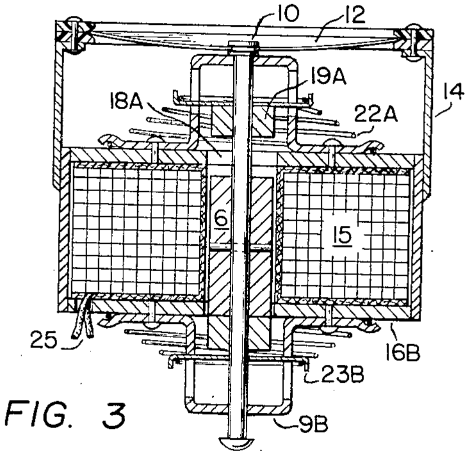
Fig. 3 shows the first change of position that will take place, upon the part of components originally disposed as in Fig. 2, in response to energization.

The movable parts do not actually pause in their Fig. 3 positions. The auxiliary member contributes some kinetic energy to the heavier armature upon impact, so that the latter gets off to a fast start. It may be that the armature starts to move slightly before the appropriate segment actually hits it. Whether or not this happens has been impossible to determine in practice because of the speed with which the events takes place. At any rate, Fig. 3 should be regarded as depicting an idealized situspeed with which the event takes place. At any rate, ing feature of this transient situation is that, as can be seen from the figure, idle segment 19A has been moved even farther away from the region where it could exert a deleterious influence. Conditions are thus optimum just prior to the movement of the armature, which latter movement is, of course, the "big push" of the sequence.

Figure 4:
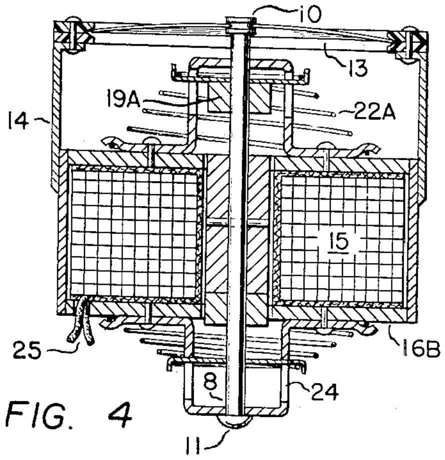
Fig. 4 shows the effect of continuing energization upon parts which were an instant earlier in their Fig. 3 positions.

In moving from the position of Fig. 3 to that of Fig. 4, the armature-shaft assembly will force snap spring 12 overcenter so that the bias of the latter is exerted in the opposite direction. Meanwhile, spring 22A will be stretched even more because of the forced movement of the auxiliary member 21 along with the armature. But as long as energization persists the auxiliary member will hold its position relative to the armature because of the magnetic attraction between segment 19B and the lower end of the armature.

Upon de-energization the armature will continue to maintain its new position because it is held therein by snap spring 12. The auxiliary member, however, will snap back to its central position and the situation of Fig. 5 will obtain.

It has been shown, then, that the net effect of supplying an electrical impulse to the device when in its Fig. 2 state is to shift it to its Fig. 5 state after the impulse has passed. But the Fig. 5 state is the inverse or reciprocal (insofar as magnetic parts are concerned) of the Fig. 2 state. It can be readily seen by one skilled in the art that the effect of a succeeding impulse will be to again restore the Fig. 2 state. The sequence of events in response to the fresh energization and de-energization will be the same as that already described except that the roles of upper and lower parts will be interchanged and the directions of movement will be inverted.

*Application*

The illustrative embodiment is not shown as being harnessed to perform any particular useful task. Whatever the task, apparatus which does not form a part of the invention is necessarily involved. To have included such apparatus would have impaired the clarity of the drawings.

Probably the most obvious use for the embodiment shown would be as a motor for a relay. To complete the device for this purpose the only addition necessary would be two or more electrical contacts. These contacts may be arranged to be actuated by shaft 8 in any of several manners familiar to those skilled in the art. It may be desirable to take advantage of the presence of snap spring 12 by fastening the contacts to it rather than to the shaft. If the base of a movable contact arm is attached to the snap spring near its periphery, the contact will have a fast snap action imparted to it.

An important advantage of the invention is that contacts may also be attached to the auxiliary member, to be actuated by that member independently of the armature. In an embodiment similar to that shown I have used the last-mentioned arrangement to provide contacts which close only on every second impulse and which remain closed only for the duration of the impulse. If contacts be mounted on both armature and auxiliary member, various one-, two-, three-, and four-step sequences can be contrived. Thus, although the principal actuating motion is two-step in nature, a switching sequence more complicated than two-step is readily achieved.

What I claim is:

1. An electromagnetic device comprising at least: armature means mounted to be movable into two stable positions in alternating sequence; a stator frame arranged to generally define in combination with said armature means an operationally symmetric magnetic structure; coil means adapted to intermittently magnetize said magnetic structure in response to intermittent electrification of said coil means; and controlling means including auxiliary magnetic material, said controlling means being adapted to respond during each period of de-energization to the preceding movement of said armature means by transporting the entirety of said auxiliary material into one or the other of two yieldably maintained relative positions so determined that in each of said positions the closest portion of said auxiliary material is at a slight distance from a respective point on said magnetic structure at which the subsequent application of said auxiliary material will unbalance the magnetic symmetry of said magnetic structure in that sense which is sequentially appropriate upon each occasion.

2. The combination set forth in claim 1 further characterized in that each pole of said operationally symmetric magnetic structure is singular.

3. An electromagnetic device comprising at least: armature means mounted to be movable into a first stable position or a second stable position; a stator frame disposed to define in combination with said armature means an operationally symmetric magnetic structure in which each pole is singular; coil means mounted in magnetically energizing relationship to said magnetic structure; auxiliary magnetic material mounted to be movable as a unit into one or the other of two structure-augmenting positions in effective contact with said magnetic structure to selectively impart to said structure respective overall magnetic conformations, said conformations being so determined that if one conformation prevails at the time of energization said armature means will be magnetically urged toward its first stable position whereas if the other conformation prevails at the time of energization said armature means will be magnetically urged toward its second stable position; and potential energy storing means adapted to bias said auxiliary magnetic material toward yieldably maintained positioning so close to one or the other of said structure-augmenting positions and so determined in accordance with the concurrent positioning of said armature means in each case that in the presence of energization said auxiliary material will be magnetically attracted from the yieldably maintained positioning into the appropriate one of said structure-augmenting positions for producing a stroke of said armature means.

4. The combination set forth in claim 3 further characterized in that the motion permitted to both said armature means and said auxiliary magnetic material by their respective mountings is reciprocative in nature.

5. An electromagnetic device comprising at least: a stator frame; armature means positioned to define in combination with said stator frame an operationally symmetric magnetic structure which incorporates two variable air gaps each continuously lying in the principal flux path provided by said structure, said armature means being mounted to be movable into either of two stable positions in such a mode that movement toward each of said positions lowers the reluctance of a different one of said air gaps; coil means mounted in magnetically energizing relationship to said magnetic structure; auxiliary magnetic material mounted to be movable as a unit into either of two structure-augmenting positions, said auxiliary material being so arranged that in each of said structure augmenting positions at least a portion of said material becomes effectively applied to said magnetic structure in the region of a different one of said gaps to maintain the reluctance of that gap low and substantially constant despite normal movements of said armature means; and resilient means adapted to bias said auxiliary magnetic material toward yieldably maintained positioning which is arranged to be so close to one or the other of said structure-augmenting positions as selectively determined in accordance with the concurrent positioning of said armature means that said auxiliary material having assumed the determined yieldably maintained positioning during any given period of de-energization will, upon the onset of energization, be magnetically attracted therefrom into the appropriate one of said structure-augmenting positions for influencing the reluctance in that one of said gaps whose reluctance is already at a minimum.

6. The device of claim 5 further characterized in that said auxiliary magnetic material, in becoming applied to said magnetic structure as set forth, becomes applied exclusively to said armature means portion of said structure.

7. The device of claim 5 further characterized in that said armature means consists entirely of a single, integral member.

8. An electromagnetic device comprising at least: auxiliary magnetic material in the form of two spaced segments inelastically connected together, said auxiliary material being mounted to be movable as a unit in some reciprocative mode; resilient means biasing said auxiliary magnetic material toward a position midway of its operational travel range; armature means having two respectively singular poles, said armature means being mounted to be movable in a mode similar to that of said auxiliary magnetic material and having such positioning with regard to said auxiliary material that respective segments of said material may alternately be brough into effective contact with respective poles of said armature means, the range of travel permitted to said armature means being limited to that having at each extreme a limiting position wherein one or the other of the poles of said armature means will be yet slightly spaced from a corresponding one or the other of said segments under those circumstances wherein said auxiliary magnetic material remains in its said midway position; a stator frame arranged to define a magnetic circuit looping from the region of one pole of said armature means to the region of the other pole of said armature means; and coil means adapted to magnetically energize the magnetic circuit thus defined.

9. The combination set forth in claim 8 further comprising mechanism for biasing said armature means to retain either of its limiting positions pending operational shifts from one to the other of said positions.

10. The device of claim 8 further characterized in that said segments of auxiliary magnetic material are integrally connected together to constitute a single auxiliary member, and still further characterized in that said armature means has the form of a single, integral member.

11. An electromagnetic device comprising at least: a coil wound about a central, axially penetrating hole; a stator frame including structure mounted adjacent to both ends of said coil and shaped to extend on said ends in directions having at least one radial component, said stator frame terminating centrally in an opening at each end of said coil, said openings being located and shaped to embrace axial extension of said hole through said coil, the surfaces of said stator frame which face said openings constituting respectively the poles of said stator frame; an armature adapted to slide along the axis of said coil within said hole, said armature being axially shorter than the outside dimension of the axial span of said poles, the range of travel permitted to said armature being structurally restricted, said range being determined to meet the requirement that in making a full stroke in either axial direction the armature will have completed the greater portion of its permitted travel before protruding beyond that one of said poles toward which it is travelling, said armature being normally retained in either of its extreme positions pending operational shifts from one to the other; an auxiliary member including two spaced segments of magnetic material and a yoke of non-magnetic material rigidly connecting said segments, said auxiliary member being mounted to permit said segments to slide along the axis of said coil with each segment at an opposite end of said armature, the axial distance between said segments being greater than the axial lengths of said armature by an amount exceeding the length of stroke permitted to said armature, the range of travel permitted to said auxiliary member extending to the limits wherein one or the other of said segments can make effective contact with said armature in any position of the latter; and resilient means biasing said auxiliary member toward a position wherein said segments will be located equidistant from the midpoint between said poles.

References Cited in the file of this patent

UNITED STATES PATENTS

| | | |
|---|---|---|
| 2,595,285 | O'Brien et al. | May 6, 1952 |
| 2,885,606 | Clements | May 5, 1959 |

FOREIGN PATENTS

| | | |
|---|---|---|
| 403,992 | Great Britain | Dec. 27, 1933 |

OTHER REFERENCES

"Relays for Electronic and Industrial Control" (Walker), London, 1953, pages 265–266.

UNITED STATES PATENT OFFICE

CERTIFICATION OF CORRECTION

Patent No. 2,972,091 February 14, 1961

Warner W. Clements

It is hereby certified that error appears in the above numbered patent requiring correction and that the said Letters Patent should read as corrected below.

Column 11, line 55, strike out "speed with which the event takes place. At any rate," and insert instead -- ation which is achieved transiently at best. An interest--.

Signed and sealed this 11th day of July 1961.

(SEAL)
Attest:

ERNEST W. SWIDER
Attesting Officer

DAVID L. LADD
Commissioner of Patents